United States Patent

[19]

Shimada et al.

[11] 3,894,435
[45] July 15, 1975

[54] PRESSURE SENSOR

[75] Inventors: Satoshi Shimada, Hitachi; Ichiro Kimura, Mito, both of Japan

[73] Assignee: Hitachi, Ltd., Japan

[22] Filed: Oct. 25, 1973

[21] Appl. No.: 409,416

[30] Foreign Application Priority Data
Nov. 1, 1972 Japan.............................. 47-108832

[52] U.S. Cl................. 73/393; 73/115; 73/398 AR; 73/407 R
[51] Int. Cl. ............................................. G01l 9/04
[58] Field of Search....... 73/393, 115, 118, 398 AR, 73/407 R, 410, 406; 267/180

[56] References Cited
UNITED STATES PATENTS

| 3,195,568 | 7/1965 | Pearl | 267/180 |
| 3,444,736 | 5/1969 | Stedman | 73/407 R |
| 3,485,104 | 12/1969 | Sanford | 73/407 R |
| 3,611,711 | 10/1971 | Mueller | 73/407 |
| 3,780,588 | 12/1973 | Whitehead, Jr. et al. | 73/398 AR |

FOREIGN PATENTS OR APPLICATIONS
635,003 2/1962 Italy.................................... 267/180

*Primary Examiner*—Jerry W. Myracle
*Assistant Examiner*—Marcus S. Rasco
*Attorney, Agent, or Firm*—Craig & Antonelli

[57] ABSTRACT

A semiconductor strain gauge is mounted on a cantilever whose free end is moved by a diaphragm or bellows adapted to be displaced by a pressure in a pressure chamber which varies, whereby the semiconductor strain gauge can produce an electric signal in accordance with the pressure. The diaphragm and bellows are constructed such that they produce a counter balancing force which increases in coefficient in accordance with an increase in the amount of its displacement.

2 Claims, 6 Drawing Figures

PRESSURE SENSOR

This invention relates to pressure sensors, and more particularly it deals with a pressure sensor adapted to produce a condition signal used for calculating the volume of fuel supplied to an internal combustion engine of a motor vehicle.

An electronically controlled fuel injection supply device is used nowadays for supplying fuel to an internal combustion engine of a motor vehicle. This device is capable of controlling fuel supply to the engine with a higher degree of precision than a Venturi type carburetor or a mechanical fuel injection supply device. Thus the device seems to bid fair to succeed in reducing noxious components of exhaust gases. The device comprises an electronic control circuit which receives as its input an electric signal consistent with the size of a atmospheric or negative pressure in a suction manifold in order to calculate the volume of fuel supplied to the engine. Thus the device must be provided with a pressure sensor which is capable of measuring the negative pressure in the suction manifold and converting the same into an electric signal with a high degree of precision.

For example, a decrease in atmospheric pressure at high altitude results in a reduction in air density, so that a change is caused to occur in the air-fuel ratio. Thus, in order to maintain the air-fuel ratio at an optimum level, it is necessary to detect the atmospheric pressure and modify fuel supply accordingly. An optimum output condition can be obtained for an atmospheric pressure reference range and an absolute pressure reference range by varying output characteristics. It is required to obtain a smooth change in characteristics between the two ranges.

One of the objects of this invention is to provide a pressure sensor whose output characteristics vary depending on the value of a pressure.

Another object of the invention is to provide a pressure sensor whose output characteristics vary smooth in accordance with the value of a pressure.

Another object of the invention is to provide a pressure sensor which has an output characteristic based on atmospheric pressure and an output characteristic based on absolute pressure.

Another object of the invention is to provide a pressure sensor which employs a semiconductor strain gauge.

Other and additional objects and features of the invention will become evident from the description set forth hereinafter when considered in conjunction with the accompanying drawings.

The outstanding characteristic of the invention is that means is provided for converting the amount of displacement of pressure receiving means, so that the coefficient of a reaction produced by the pressure receiving means when a pressure is brought to bear thereon can be smoothly varied according to the amount of displacement of the pressure receiving means.

Figure 1:
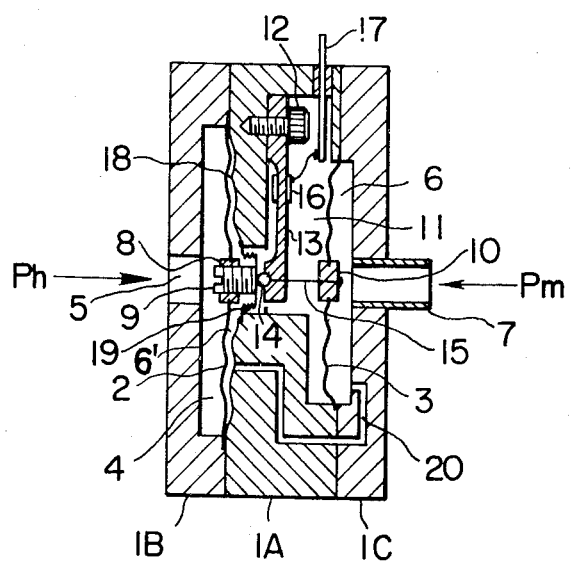
FIG. 1 is a vertical sectional front view of the pressure sensor according to the invention.

In FIG. 1, 1A, 1B and 1C are casing members forming a casing in which diaphragms 2 and 3 are mounted. Defined between the diaphragm 2 and the casing member 1B is an atmospheric pressure chamber 4 which is maintained in communication with atmosphere through a port 5 to introduce atmospheric pressure $Ph$ thereinto. Defined between the diaphragm 2 and the casing member 1C is a sub-atmospheric or negative pressure chamber 6 which is maintained in communication with a manifold (not shown) of the internal combustion engine through a conduit 7 so as to introduce a negative pressure $Pm$ thereinto from the manifold.

The diaphragm 2, which is exposed to the atmospheric pressure $Ph$, is of concentric wave shape in cross-section and capable of converting a pressure into a force which is proportional to the force. Mounted in the central portion of the diaphragm 2 is a rigid body 8 into which an adjusting screw 9 is threaded.

An airtight seal is, of course, provided between the diaphragm and the rigid body and the rigid body and the adjusting screw.

A rigid body 10 is mounted in the central portion of the diaphragm 3, and a small bellows 19 is mounted between the two diaphragms 2 and 3. A negative pressure chamber 6' defined between the diaphragm 2 and bellows 19 is maintained in communication with the negative pressure chamber 6 through a duct 20. A vacuum chamber 11 is defined between the diaphragm 3 and bellows 19, and a cantilever 13 fixed at its base to the casing member 1A by a screw 12 extends into the vacuum chamber 11. A steel ball 14 is mounted at a free end of the cantilever 13 which is disposed on an imaginary line connecting the adjusting screw 9 to the rigid body 10. The adjusting screw 9 is maintained at its forward end in rotatable engagement with the steel ball 14 through the bellows 19. The free end of cantilever 13 is connected to the rigid body 10 through a flexible piano wire 15.

The relative positions of the cantilever 13 and diaphragm 3 are set such that the adjusting acrew 9 is tightened and the cantilever 1 is urged to move a distance corresponding to a correction to be effected to compensate for the effect of a fall in the atmospheric pressure (that is, the cantilever 13 is moved such that the forward end of the adjusting screw 9 will not be brought out of engagement with the free end of cantilever 13 when the atmospheric pressure falls to an expected level).

A semiconductor strain gauge 16 is mounted substantially in the middle of cantilever 13 to be disposed on opposite sides of the cantilever 13. An electric signal produced by the strain gauge 16 is taken out through an airtight glass terminal 17. An output signal produced by the aforesaid biasing of the cantilever 13 is set at a desired level by means of an external circuit.

The casing member 1A is formed with a stopper 18 for regulating the movement of the diaphragm 2, the surface of a portion of the stopper 18 juxtaposed against the diaphragm 2 being of the same wave shape as the diaphragm 2. The diaphragm 2 and stopper 18 are spaced apart from each other such that the clearance in an outer marginal portion is smallest and grows larger in going toward an inner peripheral portion.

In the pressure sensor constructed as aforementioned, when the pressure is in a range in which the difference between the atmospheric pressure $Ph$ in the atmospheric pressure chamber 4 and the pressure $Pm$ in the manifold is small and the diaphragm 2 is not in contact with the stopper 18, the force exerted on the cantilever 13 to move the same is the sum of a force with which the diaphragm 2 pushes the cantilever through the adjusting screw 9 and a force with which the diaphragm 3 pulls the cantilever through the piano wire 15. At this time, an electric signal voltage $e$ can be calculated as follows:

$$A_B(Pm - o) + A_D(Ph - Pm) + 2A_D(o - Pm) = \chi \cdot \Sigma S \quad (1)$$

Since $A_B \ll A_D$, $$A_D Ph - A_D Pm - \alpha A_D Pm = \chi \cdot \Sigma S \quad (2)$$

$$A_D\{Ph - Pm(1 + \alpha)\} = \chi \cdot \Sigma S$$

$$= \frac{A_D\{Ph - Pm(1 + \alpha)\}}{\Sigma S} \quad (3)$$

$$e = K\chi \quad (4)$$

$$e = \frac{KA_D\{Ph - Pm(1 + \alpha)\}}{\Sigma S} \quad (5)$$

Where
$\Sigma S = S_D + \beta S_D + S_B + S_C$
$A_D$ : The effective area of the diaphragm 2.
$\alpha A_D$ : The effective area of the diaphragm 3.
$A_B$ : The effective area of the bellows 19.
$S_D$ : The rigidity of the diaphragm 2.
$\beta S_D$ : The rigidity of the diaphragm 3.
$S_b$ : The rigidity of the bellows 19.
$S_C$ : The rigidity of the cantilever 13.
$K$ : The coefficient of conversion of the amount displacement of the cantilever into the electric signal.
$\chi$ : The amount of displacement of the cantilever.

Figure 6:
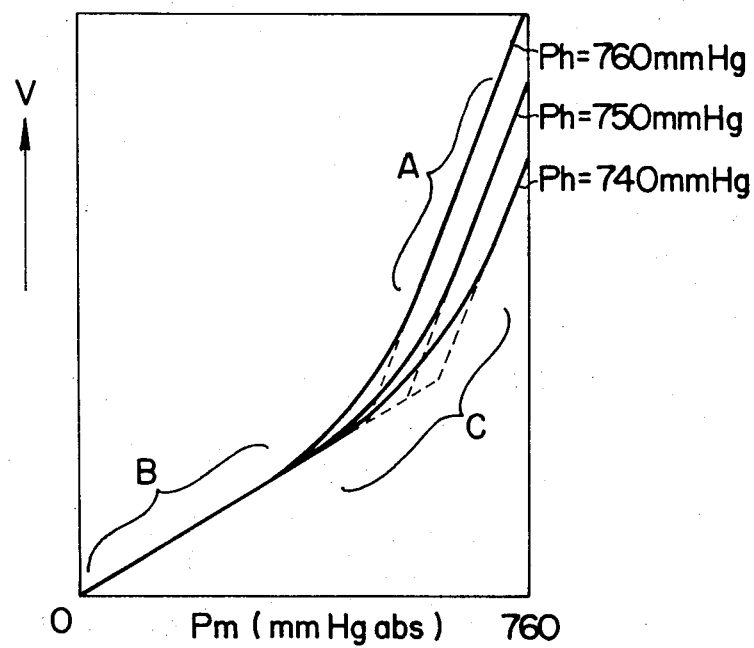
FIG. 6 is a diaphragm showing output characteristics.

It will be evident from these formulas that the electric signal voltage $e$ is related in value to $Ph-Pm$. Thus the characteristic of the range A shown in FIG. 6 is produced, so that correction can be effected in accordance with the atmospheric pressure $Ph$ (which may vary depending on the altitude). The output voltage $e$ of the strain gauge 16 is made to rise when the forward end of the cantilever 13 moves from left to right in FIG. 1, so that the atmospheric pressure detecting diaphragm 2 is out of engagement with the stopper 18 in a pressure range in which the manifold pressure $Pm$ is near the atmospheric pressure $Ph$ in value. Thus, when the motor vehicle is at a high altitude and the atmospheric pressure $Ph$ falls (for example, to $Ph=750$ mmHg abs.), the diaphragm 2 moves leftwardly in FIG. 1, so that the output voltage $e$ falls and shows a change which follows the curve of $Ph=750$ mmHg abs. in FIG. 6, thereby correcting the air-fuel ratio to compensate for the effect of altitude on air density.

When the value of $Ph-Pm$ increases (or $Pm$ becomes much smaller than $Ph$), the outer peripheral portion is brought into engagement with the stopper 18 and the force exerted on the cantilever 13 decreases as the effective area of the diaphragm 2 decreases. That is, the force exerted on the cantilever decreases gradually as follows:

$$A_D(1 - K\chi^2) \quad (6)$$

Where $K$ is the constant.

The rigidy of the cantilever also increases gradually, so that the output voltage $e$ shows a change as expressed by the following formulas:

$$A_D(1 - K\chi^2)(Ph - Pn) + \alpha A_D(o - Pm) = \chi[S_D(1 + K'\chi^2) + \beta S_D + S_C + S_B] \quad (7)$$

$$A_D[Ph(1 - K\chi^2) - Pm(\alpha + 1 - K\chi^2)] = X[\Sigma S - S_D K'X^2]$$

$$\therefore \chi = \frac{A_D\{Ph(1 - KX^2) - Pm(\alpha + 1 - KX^2)\}}{\Sigma S + S_D K'\chi^2} \quad (8)$$

From formula (4), $$e = K \cdot \frac{A_D\{Ph(1 - KX^2) - Pm(\alpha + 1 - KX^2)\}}{\Sigma S + S_D K'X^2} \quad (9)$$

This pressure region corresponds to the region C in FIG. 6. That is, the output voltage $e$ changes very smoothly in sensitivity, and consequently the manifold pressure changes smoothly or the output torque changes smoothly when the acceleration pedal is depressed, thereby contributing to an increase in the riding comfort of the vehicle at the time of acceleration or deceleration.

When the manifold pressure $Pm$ further decreases and the diaphragm 2 is brought into full engagement with the stopper 18 so that the manifold ceases to function, it is only a force proportional to $0-Pmm$ and acting on opposite sides of the diaphragm 3 that thereafter causes the cantilever 13 to move. The output voltage $e$ in this ppressure region can be expressed by the following formula:

$$e = K \frac{\alpha A_D}{\Sigma S} Pm \quad (10)$$

At this time, the value of S is the sum of the rigidity of diaphragm 3 and the rigidity of cantilever 13 and smaller than the value of the denominator of formula (9). However, by giving a small value to the ratio of the area of one diaphragm to that of the other diaphragm in designing the pressure sensor, it is possible to produce a proper fall in sensitivity (a fall represented by the gradient of the curves in FIG. 6). The output characteristic of this pressure range is that of the range B in FIG. 6.

As aforementioned, the change is slow in the boundary between the ranges A and B and thus the change in output takes place smoothly. Therefore, by incorporating the invention in a motor vehicle for effecting the control of fuel supply to the engine, it is possible to advantageously control the air-fuel ratio at high altitudes and to accelerate or decelerate the vehicle by operating the accelerator without impairing riding comfort.

Figure 2:
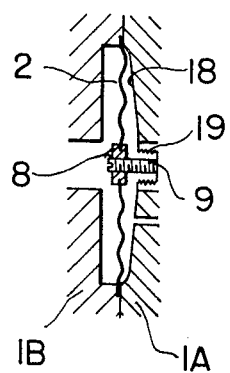
FIG. 2, FIG. 3, FIG. 4 and FIG. 5 are vertical sectional front views showing other embodiments of the atmospheric pressure receiving means.
Figure 3:
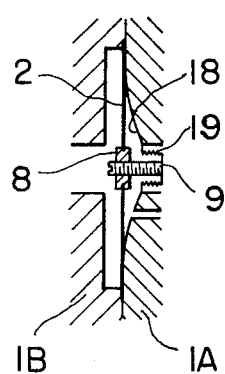

FIG. 2 and FIG. 3 show the relation between the diaphragm 2 and stopper 18. In FIG. 2, the diaphragm 2 is of wave form in cross-section and a surface portion of the stopper 18 juxtaposed against the diaphragm is planar. In FIG. 3, the diaphragm 2 and stopper 18 are both planar in surface.

Figure 4:
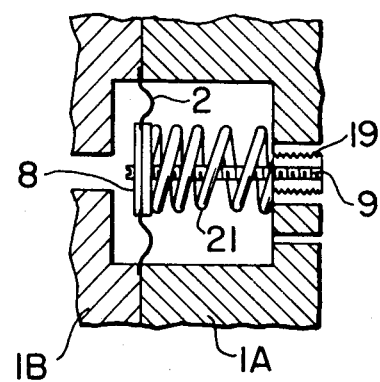
Figure 5:
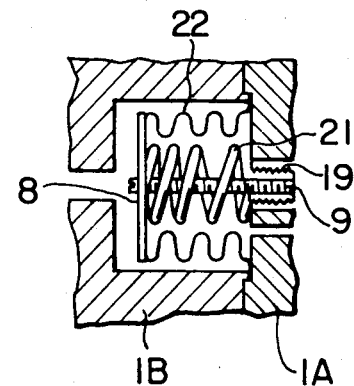

In FIG. 4 and FIG. 5, the stopper 18 is replaced by an unequal pitch coil spring 21. The coil spring 21 is used with the diaphragm 2 in FIG. 4 and with a bellows 22 in FIG. 5. In this embodiment, convolutions of the spring are brought into engagement with one another starting with the smaller pitch convolutions as the diaphragm 2 or bellows 22 is dispaced, and the effective number of windings is reduced (and thus the rigidity of the spring is increased). As a result, the signal voltage $e$ undergoes a change as follows:

$$e = K \frac{A_D\{Ph - (1 + \alpha)Pm\}}{\Sigma S(1 + K'\chi)} \quad (11)$$

From this formula, it is possible to obtain a characteristic similar the characteristic obtained from formula (9), so that acceleration and deceleration can be effected smoothly.

We claim:

1. A pressure sensor comprising two diaphragms differing from each other in effective diameter, a bellows interposed between said two diaphragms, a vacuum chamber defined by said bellows and the smaller diameter diaphragm, a cantilever disposed in said vacuum chamber and adapted to be moved by said two diaphragms, a semiconductor strain gauge producing an electric signal consistent with the strain produced in the surface of the cantilever, an atmospheric pressure chamber exposing one side of the larger diameter diaphragm to atmosphere, and a chamber exposing the other side of each of said two diaphragms to an engine manifold.

2. A pressure sensor according to claim 1 wherein the diaphragm exposed to atmosphere is adapted to be brought into engagement with a diaphragm stopper when it is displaced, the former being brought into engagement with the latter first at their outer peripheral portions and the area of contact between them gradually extending into their inner peripheral portions.

* * * * *